(12) United States Patent
Hermes

(10) Patent No.: US 8,756,985 B2
(45) Date of Patent: Jun. 24, 2014

(54) METHOD FOR CHECKING A FUNCTIONALITY OF A RAIL PRESSURE SENSOR

(75) Inventor: Henning Hermes, Wolfach (DE)

(73) Assignee: Robert Bosch GmbH, Stuttgart (DE)

( * ) Notice: Subject to any disclaimer, the term of this patent is extended or adjusted under 35 U.S.C. 154(b) by 35 days.

(21) Appl. No.: 13/440,211

(22) Filed: Apr. 5, 2012

(65) Prior Publication Data

US 2012/0255348 A1     Oct. 11, 2012

(30) Foreign Application Priority Data

Apr. 6, 2011  (DE) .......................... 10 2011 006 843

(51) Int. Cl.
*G01M 15/04*  (2006.01)
(52) U.S. Cl.
USPC ...................................................... 73/114.43
(58) Field of Classification Search
USPC ...................................................... 73/114.43
See application file for complete search history.

(56) References Cited

U.S. PATENT DOCUMENTS

| 7,472,690 | B2 * | 1/2009 | Takayanagi et al. .......... 123/446 |
| 7,698,931 | B2 * | 4/2010 | Hanari et al. ............. 73/114.43 |
| 7,991,538 | B2 | 8/2011 | Olbrich et al. |
| 8,261,605 | B2 * | 9/2012 | Hermes et al. ............. 73/114.51 |
| 2009/0019926 | A1 | 1/2009 | Sommerer |
| 2009/0164102 | A1 * | 6/2009 | Olbrich et al. ................ 701/103 |

FOREIGN PATENT DOCUMENTS

| DE | 102007032509 | 1/2009 |
| DE | 102008044050 | 6/2009 |

* cited by examiner

*Primary Examiner* — Freddie Kirkland, III
(74) *Attorney, Agent, or Firm* — Kenyon & Kenyon LLP

(57) ABSTRACT

A method for checking a rail pressure sensor, in which at least two values for the pressure of fuel in a fuel reservoir of an injection system are set on the basis of values for the pressure, which are ascertained by the rail pressure sensor; a desired quantity of fuel to be injected that is demanded by an idle-speed controller being ascertained for each set value of the pressure; and the desired quantities being compared to one another.

10 Claims, 2 Drawing Sheets

METHOD FOR CHECKING A FUNCTIONALITY OF A RAIL PRESSURE SENSOR

CROSS REFERENCE

The present application claims the benefit under 35 U.S.C. §119 of German Patent Application No. DE 102011006843.0 filed on Apr. 6, 2011, which is expressly incorporated herein by reference in its entirety.

FIELD OF THE INVENTION

The present invention relates to a method and a system for checking a functionality of a rail pressure sensor.

BACKGROUND INFORMATION

The determination of accurate values of the rail pressure by a rail pressure sensor (RPS) is important for the operation of a common rail injection system. The pressure in a fuel reservoir of such an injection system must be regulated and monitored, so that, for example, damage to the injection system by excessive pressure may be prevented. In addition, a high degree of accuracy is important for metering in the correct injection quantity, since this is relevant to emissions. The legislation for performing an on-board diagnosis of a motor vehicle stipulates monitoring of the RPS in the normal operating range. However, at present, the correct functioning of the RPS with regard to load decrease, short circuit or offset may only be monitored in a highly limited manner.

German Patent Application No. DE 10 2008 044 050 A1 describes a fuel system of an internal combustion engine, in which the fuel quantity injected into a combustion chamber is a function of the control duration. In addition, a pressure sensor measures the pressure in the fuel rail and provides a signal. The pressure in the fuel rail may be adjusted to a setpoint pressure with the aid of a setting device, using a signal provided by the pressure sensor. To test the fuel system, a test quantity of fuel to be injected is set, and the internal combustion engine is operated at a first setpoint pressure, and a first control duration corresponding to the test quantity of fuel to be injected, in order to provide a first operating state. In addition, a speed-dependent or torque-dependent variable characterizing the first operating state is measured. Subsequently, a second operating state is set, and a variable characterizing it is likewise measured. The two measured variables are compared to one another.

A method for operating a fuel injection system of an internal combustion engine is described in German Patent Application No. DE 10 2007 032 509 A1. In this connection, at least one operating variable of an injector, which is a function of a fuel pressure prevailing in a pressure reservoir, is evaluated in order to deduce the fuel pressure.

SUMMARY

In one example embodiment of the present invention, an idle-speed controller's desired quantity of fuel to be injected, and therefore, a desired quantity of fuel to be injected that is demanded by an idle-speed controller, is monitored by a control unit at two different levels of pressure, generally, rail pressure levels, of the fuel in a fuel reservoir or fuel pressure reservoir, the so-called rail of an injection system generally taking the form of a common rail injection system. In this context, a physical quantity actually injected while idling is typically a function of the actual pressure of the fuel, as well as of a control duration. The injection nozzle for injecting the fuel is operated and/or acted upon, generally, supplied with current, by controlling it. A relationship between the quantity actually injected and the required control duration is a function of pressure and may be represented by a control-duration characteristics map.

In the event of deviations of a measured value of the rail pressure sensor, a nonlinearity of the control-duration characteristics map of an injection nozzle or an injector as a component of the injection system results in a difference in the desired quantity of the idle-speed controller, which is necessary in order to provide, at two different rail pressures, the physically constant, required quantity of an internal combustion engine by which a constant idling speed of the internal combustion engine is ensured. In one embodiment of the present invention, the relative comparison of the control durations, which are produced as a function of pressure and are for providing a physical quantity of fuel to be injected at two rail pressures, may allow an evaluation to be undertaken independently of the tolerance-encumbered, absolute, required quantity of fuel of at least one combustion chamber of the internal combustion chamber.

In the example method provided within the scope of the present invention, the speed of the combustion engine is typically held constant during idling. In this context, it is taken into account that the speed is a function of the fuel quantity actually and/or physically injected. Therefore, if the speed, generally, the idling speed, is held constant, then the quantity of fuel injected per injection also remains constant.

In one example embodiment of the method of the present invention, a value for the pressure of the fuel inside of the fuel reservoir is adjusted, and therefore set, at least twice. Such regulation may be carried out by a control unit for controlling a function of the injection system and/or of the internal combustion engine. When adjusting, in each instance, a value of the pressure, the value that is indicated by the rail pressure sensor is used.

When the combustion engine is idling, an idling speed required for this is only reached if the physical quantity of fuel actually required is injected into a combustion chamber of the combustion engine. During implementation of the method, the desired quantity of fuel that the idle-speed controller demands as an internal controller variable is checked at each set value of the pressure, so that the idling speed is reached.

If the rail pressure sensor is functioning correctly and the pressure value indicated by the rail pressure sensor also corresponds to the actual value of the pressure, the same desired quantity of fuel to be injected is demanded by the idle-speed controller for all of the set values of the pressure.

However, should the rail pressure sensor be defective, then different desired quantities of the fuel to be injected are demanded for the set and, therefore, adjusted values of the pressure. If the desired quantities demanded differ markedly from one another, then this is an indication that the rail pressure sensor is functioning incorrectly.

In this connection, it is possible that the rail pressure sensor indicates a value of the pressure that is higher than the actual value. In checking the functionality of the rail pressure sensor, a first value for the pressure is initially set, in order to inject a particular, actual, physical quantity of fuel. Based on that, a first desired quantity, which is greater than the actual, physical quantity, is demanded by the idle-speed controller. At the second pressure, a second desired quantity is demanded, which is also greater than the actual quantity and, furthermore, also differs from the desired quantity that is demanded at the first pressure. Consequently, it is possible to make a statement regarding the operability of the rail pressure sensor solely on the basis of the difference of the desired quantities demanded by the idle-speed controller.

However, if the rail pressure sensor indicates a value less than the actual value at every pressure that is set, then, at every pressure, the idle-speed controller will demand a desired quantity in the form of an internal controller variable, the desired quantity being less than the actual physical quantity of fuel to be injected. In this case, however, the two desired quantities demanded will also differ from one another, so that in this case as well, only the desired quantities demanded are to be compared to one another; but these desired quantities demanded will differ markedly from one other if the rail pressure sensor should indicate incorrect values for the pressure.

In addition, a control duration may be ascertained as a measured value. In the case of a fuel pressure that is actually prevailing, a predetermined rotational speed, e.g., one that is kept constant, only sets in if a physical quantity of fuel corresponding to it is injected per injection. This physical quantity is set by the idle-speed controller, by regulating the desired quantity that corresponds to the pressure measured by the rail pressure sensor in accordance with a control-duration characteristics map. At a given pressure, it may be checked if the physical quantity is provided, by ascertaining the speed of the internal combustion engine.

A control duration, which results during the regulation and may be referred to as an actual control duration, sets in as a function of the actual pressure, when the physical quantity and, therefore, the predetermined speed, is reached.

For implementing the method and, consequently, for checking the operability of the rail pressure sensor, it is assumed that the selected pressure is reached when the selected value of the pressure is ascertained by the rail pressure sensor. In this context, it must be taken into account that the value of the pressure ascertained by the rail pressure sensor does not automatically agree with the actual value.

If the actual control duration is identical to the setpoint control duration or at least nearly identical to it in view of systematic errors, then this is an indication that the value of the pressure of the fuel is being correctly ascertained by the rail pressure sensor. In this case, namely, at a predetermined speed and the selected pressure, which corresponds to the pressure actually prevailing and at least nearly corresponds to the pressure ascertained by the rail pressure sensor, it follows that at the set, actual control duration, the physical quantity of fuel corresponding to the speed is also injected. This may be verified by checking the above-mentioned operating parameters with the aid of the control-duration characteristics map, as well as by comparing the actual control duration to the setpoint control duration.

The actual control duration, which results at the pressure actually prevailing in accordance with the control-duration characteristics map, is set by the idle-speed controller independently of the correct method of functioning of the rail pressure sensor, in order to reach the predetermined speed and, consequently, to inject the physical or actual fuel quantity corresponding to this into a combustion chamber of the internal combustion engine.

If the pressure measured by the rail pressure sensor deviates considerably from the actual pressure, the result of this is that the required, actual control duration set by the idle-speed controller deviates considerably from the setpoint control duration, in view of possible systematic errors. The set, actual control duration is the control duration, which is actually required to reach the predetermined speed that sets in at the pressure actually prevailing, when the physical quantity of fuel corresponding to it is provided.

On the other hand, the setpoint control duration is the control duration, which is supposed to result at the pressure measured by the rail pressure sensor, in view of the control-duration characteristics map, in order to theoretically obtain the desired quantity of fuel demanded. A deviation of the actual control duration from the theoretically provided setpoint control duration is an indication that the pressure ascertained by the rail pressure sensor does not correspond to the actual pressure.

In one embodiment of the method, during regulation, the idle-speed controller adapts the actual control duration in accordance with a given operating situation of the injection system, which is determined by the actual pressure, in order to reach the predetermined idling speed; the quantity physically injected, which is a function of the actual pressure, remaining constant. In this case, a controller output of the idle-speed controller, which provides a value of the actual control duration indirectly via the desired quantity, may be used as a measured variable. The setpoint control duration theoretically required is deduced from the desired quantity to be injected, using a relationship of the control-duration characteristics map.

Consequently, in one variant of the method, a measurement of a quantity physically injected may be omitted, since generally, only the actual control duration and the speed need to be measured in the method; the actual control duration and the speed being simple to measure in comparison with the physical quantity to be optionally checked. The injected quantity of fuel is difficult to measure with sufficient accuracy using conventional sensor technology, and given the prevailing tolerances and interference effects.

Generally, the physical quantity of fuel to be injected is automatically set via the action of the idle-speed controller during the idling of the internal combustion engine. In a specific operating situation of the injection system, the operating parameters that are adjusted to each other, that is, the actual control duration at a constant idling speed and actual pressure, set in automatically. Such an adjustment is generally a function of, e.g., structural characteristics, which may be produced individually for each injection system. Accordingly, an individual control-duration characteristics map may be determined for each injection system during a test run.

In addition, the idle-speed controller may set an actual control duration in such a manner, that at a prevailing pressure, a physical quantity results from it, through which, in turn, the intended speed is reached and, in one embodiment, remains constant. An actual control duration needed for this may be provided indirectly via the output of the idle-speed controller, using the desired quantity and the control-duration characteristics map. In one example embodiment, it is also possible to ascertain the actual control duration at least two times at different pressure values, and to evaluate it.

Using the present invention, it is possible, inter alia, to check the accuracy of measured values of a rail pressure sensor within customary operating ranges without additional sensor technology. In this context, the correctness of the functioning of the rail pressure sensor may be verified, using a desired quantity of fuel, which is demanded by an idle-speed controller and is necessary for reaching the intended speed at the pressure actually prevailing.

The example system of the present invention is configured to execute all of the steps of the example method set forth. In this context, individual steps of this method may also be implemented by individual components of the system. In addition, functions of the system or functions of individual components of the system may be implemented as steps of the method. Furthermore, it is possible to implement steps of the method as functions of at least one component of the system or of the entire system.

Additional advantages and embodiments of the present invention are derived from the description below and the figures.

It will be appreciated that the features mentioned above and the features yet to be described below may be used not only in the combination given in each case, but also in other combinations or individually, without departing from the scope of the present invention.

DETAILED DESCRIPTION OF EXAMPLE EMBODIMENTS

Figure 1:
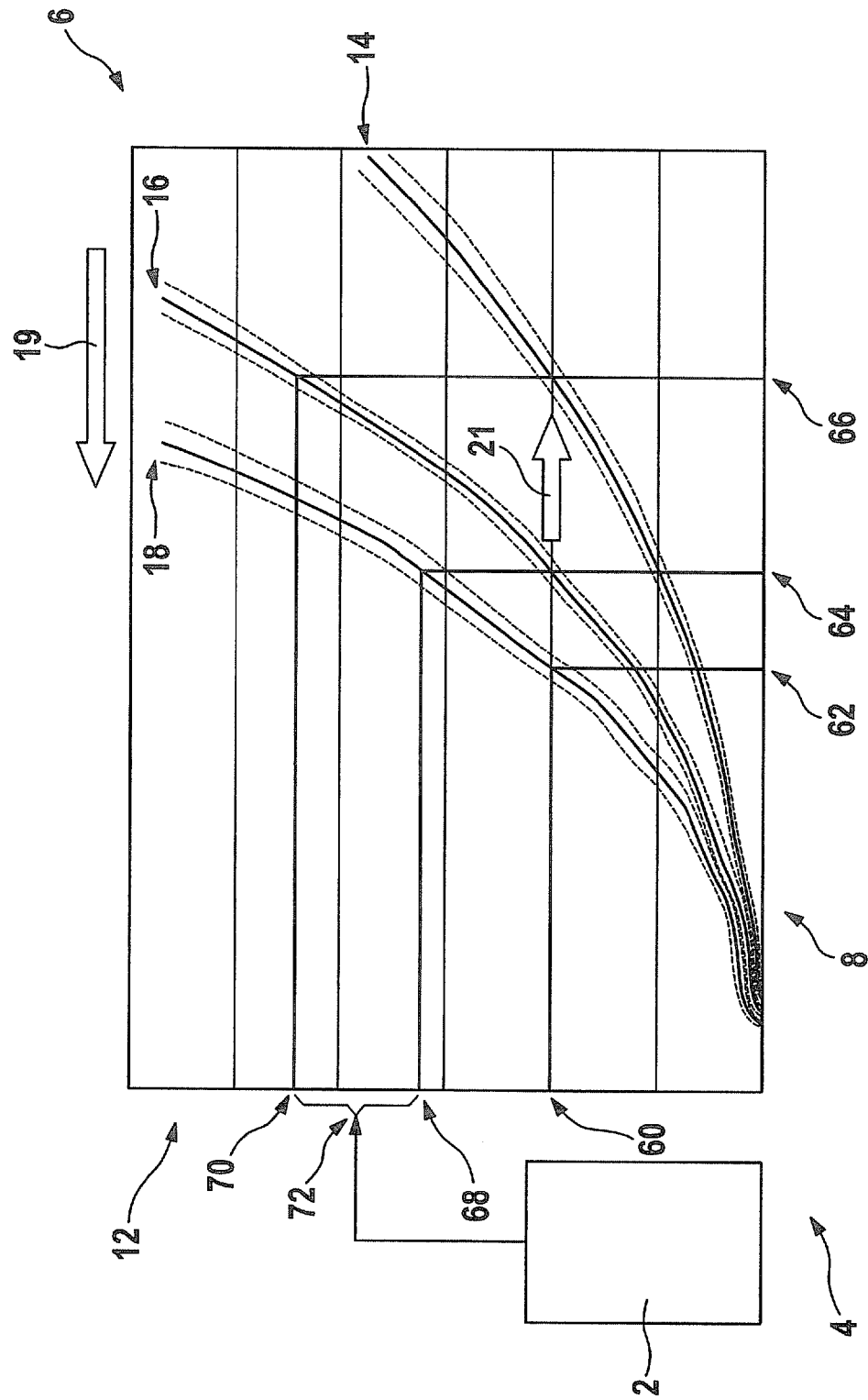
FIG. 1 shows an example of a control-duration characteristics map, which is used in a first specific example embodiment of the method of the present invention, by a schematically illustrated control unit as a component of a first specific example embodiment of the system of the present invention.

The present invention is represented schematically in the figures in light of specific embodiments, and is described in detail below with reference to the figures.

The figures are described in a cohesive and comprehensive manner; the same reference numerals denote identical components.

FIG. 1 shows a schematic illustration of a control unit 2 as a component of a first specific embodiment of the system 4 of the present invention. In this context, it is provided that in a first specific example embodiment of the method of the present invention, this control unit 2 accesses data of a control-duration characteristics map 6 represented as a graph in FIG. 1 and uses this for implementing at least one step of the example method according to the present invention.

The graph for illustrating control-duration characteristics map 6 includes an abscissa 8, along which the values for a control duration are plotted. Values for a physical quantity of fuel, which is injected by an injection nozzle into a combustion chamber of an internal combustion engine during an injection, are plotted along an ordinate 12.

Three curves 14, 16, 18, as well as their variations that may result, for example, due to systematic errors and/or tolerances, are plotted in the graph. In this context, first curve 14 shows a dependence of the physical quantity on the control duration, when the fuel in a fuel reservoir of an injection system has a pressure having the value of $p_1$. A second curve 16 shows the interrelationship of the physical quantity and the control duration at a value $p_2$ of the pressure in the fuel reservoir. If the fuel in the fuel reservoir has a pressure having the value $p_3$, the dependence of the physical quantity on the control duration is illustrated by a third curve 18. In this context, $p_1 < p_2 < p_3$. An increase in the pressure for curves 14, 16, 18 is illustrated by arrow 19.

The pressure prevailing in the fuel reservoir is normally measured by a so-called rail pressure sensor. To prepare the control-duration characteristics map 6 illustrated in FIG. 1, the curves 14, 16, 18 shown may be ascertained experimentally, using a rail pressure sensor functioning correctly and/or perfectly, and may be used for implementing the method of the present invention. Alternatively, or in addition, it is also possible to determine curves 14, 16, 18 for different values $p_1$, $p_2$, $p_2$ of the pressure by theoretical calculations and, consequently, to add to experimentally ascertained measuring points for preparing curves 14, 16, 18.

Control-duration characteristics map 6 shows that in order to provide $Q_1$ 60 as a physical quantity of the fuel at a predetermined speed, in this case, the idling speed, a control duration $t_1$ 62 is necessary for an injection at the value $p_3$ of the pressure (curve 18), a control duration of $t_2$ 64 is necessary for an injection at the value $p_2$ of the pressure (curve 16), and a control duration $t_3$ 66 is necessary for an injection at the value $p_1$ of the pressure (curve 14), where $t_1 < t_2 < t_3$. In addition, control-duration characteristics map 6 shows that at control duration $t_2$ 64, the physical quantity $Q_2$ 68 of fuel is injected when the value $p_3$ for the pressure (curve 18) is present. At the value $p_2$ for the pressure (curve 16), physical quantity $Q_3$ 70 is injected, where $Q_3 > Q_2 > Q_1$.

In implementation of the first specific example embodiment of the method according to the present invention, a substantially constant injection quantity and, consequently, a physical quantity of fuel to be injected per injection, is demanded and set by the idle-speed controller during idling. In this context, the idle-speed controller sets an actual control duration in such a manner, that the quantity actually and physically required during an injection at the pressure actually prevailing is provided. The quantity physically required is then obtained, when a speed corresponding to it is reached. If the physical, actual pressure matches the pressure, which is measured by the rail pressure sensor and is provided by the rail pressure sensor, then the actual control duration substantially corresponds to the setpoint control duration, which is derived from control-duration characteristics map 6.

If, in the event of a defect of the rail pressure sensor, the measured value of the pressure and the actual value of the pressure do not agree, then the actual control duration automatically set by the idle-speed controller deviates from the theoretically ascertained, setpoint control duration, which is actually required for providing the physically required quantity of fuel to be injected at a selected pressure and predetermined speed. Generally, on the basis of this, an inference may already be made regarding the possible presence of a deviation of the value of the pressure ascertained by the rail pressure sensor from the actual value of the pressure.

However, it must be taken into account that in the event of an absolute evaluation of the actual control duration in view of a desired quantity, an absolute torque requirement of the motor vehicle, which is driven by the internal combustion engine, may fluctuate and is not known.

Therefore, in the scope of the present invention, the desired quantity and/or the actual control duration is considered, for example, at at least two different values for the pressure. Due to the nonlinearity of control-duration characteristics map 6, when the rail pressure sensor is defective, a different deviation of the theoretically required, desired quantity from the actual desired quantity (actual control duration) is produced at a specific pressure; the actual control duration being produced at the physically required quantity, which is actually injected and is a function of pressure and speed.

To describe the first specific example embodiment of the method according to the present invention, it is assumed that the rail pressure sensor, for which the method is executed, is functioning incorrectly; for the pressure of the fuel in the fuel reservoir, the rail pressure sensor indicating a value that is greater than the value of the pressure actually prevailing by $\Delta p$. A difference $\Delta p$ in the pressure resulting from this is indicated by arrow 21.

The functionality of the rail pressure sensor is checked while the internal combustion engine is idling at a speed, which is predetermined to be constant and automatically sets in as a function of pressure, when, during idling, the quantity $Q_1$ 60 is injected by an injection nozzle of the injection system into a combustion chamber of the internal combustion engine at this speed.

In the described example for implementing the method of the present invention, it is provided that at both pressure $p_2$ (curve 16) and pressure $p_3$ (curve 18), the quantity of fuel actually physically required be $Q_1$ 60. If the rail pressure sensor is functioning correctly, then desired quantity $Q_1$ 60 is also produced at each of the two designated values $p_2$ and $p_3$ of the pressure; in each instance, desired quantity $Q_1$ 60 then also corresponding to the physical quantity of fuel actually injected.

However, if the rail pressure sensor indicates too great a value for pressure $\Delta p$, then only the value $p_2$ for the pressure actually prevails if the rail pressure sensor indicates the value $p_3$ for the pressure. In this case, the idle-speed controller must demand the desired quantity $Q_2$ 68 of fuel in order to set control duration $t_2$ 64, which means that the required quantity $Q_1$ 60 is provided at the value $p_2$ for the pressure that is physically and actually present.

However, at value $p_2$ for the pressure that is indicated by the rail pressure sensor, only one actual, physical value $p_1$ for the pressure is available, which means that the desired quantity demanded by the idle-speed controller is $Q_3$ 70, in order to inject physical quantity $Q_1$ 60.

Accordingly, two values for the pressure are set while executing the example method, here, $p_3$ (curve 18), and subsequently, $p_2$ (curve 16). The desired quantities of fuel to be injected that are demanded by the idle-speed controller are ascertained at the two set values of the pressure. If the rail pressure sensor functions incorrectly, then, in each instance, a pressure indicated by the rail pressure sensor deviates from the actual pressure. Consequently, desired quantities of fuel that differ from one another are demanded by the idle-speed controller at the two set values for the pressure. If the desired quantities demanded by the idle-speed controller deviate significantly from one another, this is an indication that the rail pressure sensor is functioning incorrectly. In the present example, desired quantity $Q_2$ 68 is demanded at set pressure $p_3$ (curve 18). At set value $p_2$ (curve 16), desired quantity $Q_3$ 70 is demanded. As shown by control-duration characteristics map 6, a difference of these two desired quantities $Q_2$ 68 and $Q_3$ 70 is $\Delta Q$ 72 and is illustrated along ordinate 12 of control-duration characteristics map 6 by the bracket.

In a first check of the functionality, it may additionally be provided that the physical quantity of $Q_1$ should be injected at the selected value $p_3$ (curve 18) of the pressure. To this end, the pressure may be regulated, for example, by control unit 2, until the rail pressure sensor indicates a value $p_3$ for the pressure. In the execution of the example method, it is assumed that the value of the pressure that is ascertained by the rail pressure sensor also corresponds to the selected pressure. In this case, the setpoint control duration should be $t_1$ 62. However, since the rail pressure sensor is functioning incorrectly, an actual control duration $t_2$ 64, which is produced at the value $p_2$ of the pressure that is now actual (curve 16), is adjusted by the idle-speed controller to reach the predetermined speed, which results at physically required quantity $Q_1$ 60. Consequently, a difference of $t_2-t_1$ results upon comparison of the actual control duration to the setpoint control duration.

In a second check of the functionality of the rail pressure sensor, the pressure of the fuel in the fuel reservoir is adjusted by control unit 2, so that the rail pressure sensor indicates a value of $p_2$ (curve 16) for the pressure, which is simultaneously provided as a value for the selected pressure, as well. In order to obtain the demanded, desired quantity $Q_1$ 60 per injection at the value $p_2$, the setpoint control duration would have to be $t_2$ 64 at the predetermined speed. However, since the actual value of the pressure in the fuel reservoir is greater by $\Delta p$ and, as indicated by the rail pressure sensor, is therefore $p_1$ instead of $p_2$ in the second check conducted here, the idle-speed controller will demand and set a control duration of $t_3$ 66 to provide the desired quantity $Q_1$ 60 of fuel demanded, which is necessary for reaching the predetermined speed. In this case, a deviation of $t_3-t_2$ between the setpoint control duration and the actual control duration is produced.

In addition, by comparing values for the control duration at the selected values $p_3$ and $p_2$ of the pressure, which are indicated by the rail pressure sensor, it follows from the two checks, that a difference $t_2-t_1$ of values of the setpoint control duration at the set values of the pressure, which difference is calculated and/or expected using control-duration characteristics map 6, also deviates from a measured, actual difference $t_3-t_2$ of values of the actual control duration at the set values of the pressure. Consequently, this deviation of differences $t_2-t_1$ and $t_3-t_2$ between the pressure-dependent values of the actual control duration and the pressure-dependent values of the setpoint control duration indicates that the rail pressure sensor is functioning incorrectly.

In view of conventional control-duration characteristics map 6 and the deviations of the desired quantity demanded and the deviations of the actual control duration from the setpoint control duration, which are ascertained in the above-described checks, it is possible, in one possible embodiment of the method, to theoretically specify, by how many bar the pressure ascertained by the rail pressure sensor deviates from the actual pressure of the fuel in the fuel reservoir. The more the checks that are carried out at different values of the pressure, the more accurately the resulting deviation regarding the value of the pressure may be quantified.

Figure 2:
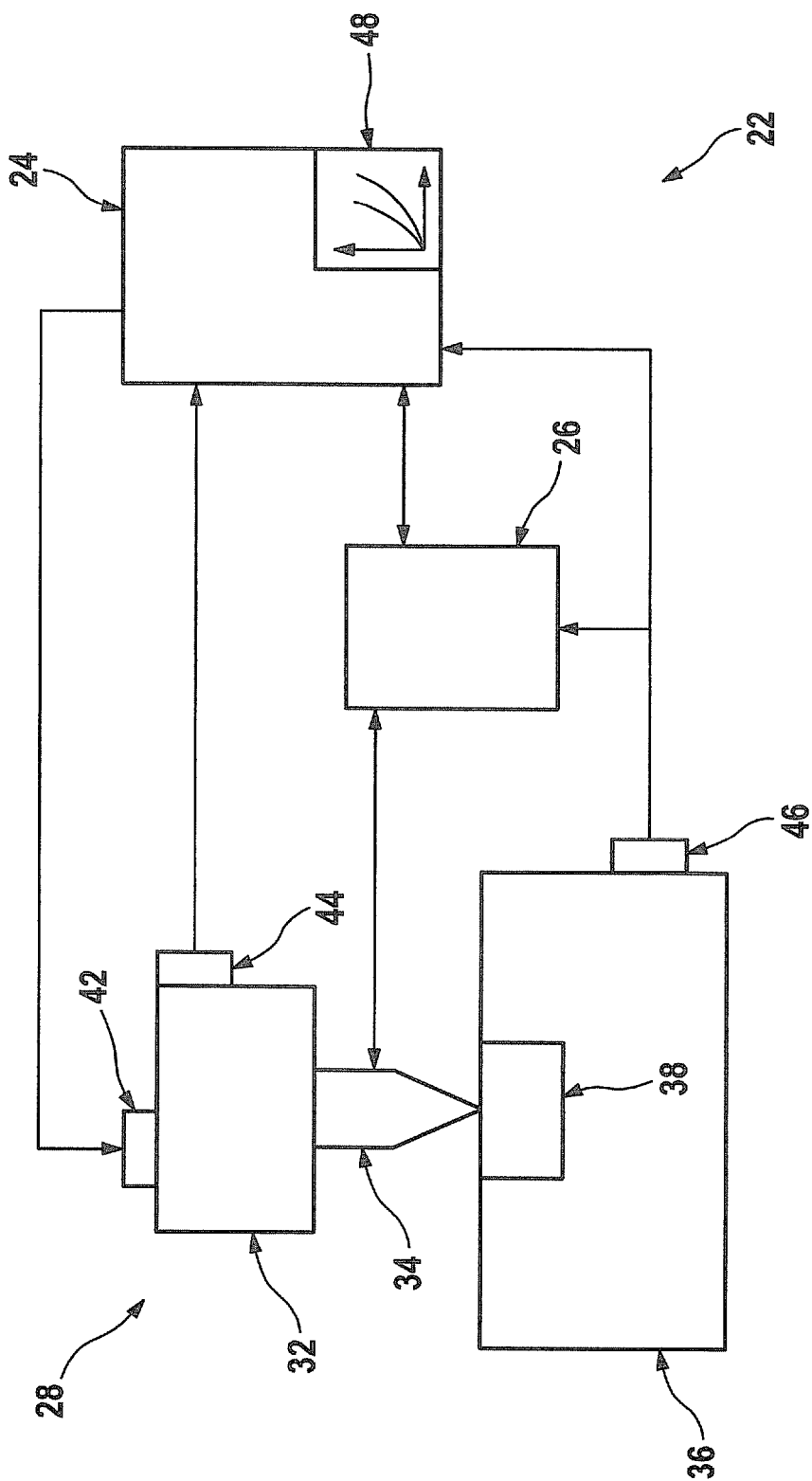
FIG. 2 shows a schematic representation of a second example specific embodiment of an example system of the present invention during implementation of a second specific embodiment of the method of the present invention.

FIG. 2 shows a second specific embodiment of the system 22 of the present invention, which includes, in this case, a control unit 24 and an idle-speed controller 26.

In addition, FIG. 2 shows a schematic representation of an example of an injection system 28, of which a fuel reservoir and, for the sake of improved clarity, only an injection nozzle 34, is illustrated here. FIG. 2 also shows a schematic representation of an example of an internal combustion engine 36, of which, in this case, only a combustion chamber 38 is shown, which normally takes the form of a cylinder. Internal combustion engine 36 normally has a plurality of, namely, n, combustion chambers 38; each combustion chamber 38 being assigned an injection nozzle 34, which means that in the specific embodiment shown, the injection system also includes n injection nozzles 34.

Irrespective of the specific embodiment of the present invention described here, control unit 24 and idle-speed controller 26 may also be configured to check and, consequently, to control and/or regulate an operation of injection system 28 and/or of internal combustion engine 36, which typically interact with one another; which means that further functions, which are independent of the method of the present invention to be implemented, may also be carried out by a control unit 24 and/or idle-speed controller 26. In one possible embodiment of the present invention, it may also be provided that idle-speed controller 26 be configured as a component of control unit 24.

FIG. 2 further illustrates a schematic representation of a pressure control valve 42, with the aid of which a pressure of the fuel stored in fuel reservoir 32 may be adjusted by control unit 24, regardless of whether or not it is executing a function of the method according to the present invention. During operation of injection system 28, a rail pressure sensor 44, which interacts with fuel reservoir 32, ascertains the pressure of the fuel in fuel reservoir 32 by measuring it. In this context, a value of the measured pressure is transmitted to control unit 24 and used by control unit 24 to set a desired pressure of the fuel in fuel reservoir 32.

Furthermore, FIG. 2 shows a speed sensor 46, by which a speed of internal combustion engine 36, usually, a speed of the camshaft of internal combustion engine 36, is ascertained. A value for the speed ascertained in this context is transmitted by speed sensor 46 to idle-speed controller 26, as well as to control unit 24.

During operation of internal combustion engine 36, it is provided that in order to execute an injection, pressurized fuel from fuel reservoir 32 be injected by injection nozzle 34 into combustion chamber 38. The fuel injected into combustion chamber 38 burns in it, by which, in turn, internal combustion engine 36 is driven. To operate injection system 28 and/or internal combustion engine 36, inter alia, the pressure of the fuel in fuel reservoir 32, the speed of internal combustion engine 36, as well as a control duration during which injection nozzle 34 is acted upon by idle-speed controller 36, are to be considered as operating parameters, so that a desired speed- and/or pressure-dependent quantity of fuel is injected into combustion chamber 38.

If the correct, physically required quantity is injected, a speed of internal combustion engine 36 corresponding to this is automatically produced, the speed being monitored by idle-speed controller 26 and/or control unit 24 on the basis of a signal provided by speed sensor 46. To obtain the quantity physically required and the speed resulting from it, an actual control duration for injection nozzle 34, from which the quantity physically and actually required is produced in a pressure- and/or speed-dependent manner, is to be set by idle-speed controller 26. Accordingly, the speed of internal combustion engine 36 is regulated by idle-speed controller 26 in view of the actual pressure, by setting the actual control duration.

In this regard, FIG. 2 also shows a control-duration characteristics map 48, which is stored, in this case, in control unit 24. Similarly to the control-duration characteristics map 6 from FIG. 1, this control-duration characteristics map 48 illustrates a dependence of the quantity physically required on a control duration at various actual values for the pressure of the fuel in fuel reservoir 32.

During the implementation of the example method according to the present invention, control unit 24 specifies an idling speed and selects at least one pressure. At a predetermined idling speed, control unit 24 also causes idle-speed controller 26 to set an actual control duration for the at least one selected pressure of the fuel, in order to provide a physically required quantity of the fuel. This selected pressure is adjusted by control unit 24 by acting upon pressure control valve 42. In this connection, the value of the pressure, which is ascertained and provided by rail pressure sensor 44, is used by control unit 24 as a reference.

At the at least one selected pressure and the predetermined idling speed, control unit 24 also compares the resulting, actual control duration to a setpoint control duration.

In this connection, it is provided that the predetermined idling speed be automatically set and kept constant by idle-speed controller 26. This may mean that idle-speed controller 26 adjusts the actual control duration by suitably varying it, which means that, for the actual control duration, an ideally constant value for the idling speed sets in as a function of the actual pressure, within the scope of customary control mechanisms.

During implementation of the example method, a value for the pressure in the fuel reservoir 32, which is normally ascertained and provided by rail pressure sensor 44 by measuring it, is used as a value of the at least one selected pressure.

In addition, to determine the control duration with the aid of control-duration characteristics map 48, it is assumed that the value ascertained by rail pressure sensor 44 corresponds to the actual value of the pressure.

Accordingly, at the predetermined idling speed, it is possible to ascertain, for a first selected pressure of the fuel, a first actual control duration at which the predetermined idling speed is produced, and in addition, it is possible to ascertain, for a second selected pressure of the fuel, a second actual control duration at which the predetermined idling speed is produced. In addition, a first deviation of the first actual control duration from a first setpoint control duration may be compared to a second deviation of the second actual control duration from a second setpoint control duration.

Generally, to check the functionality of the rail pressure sensor 44 for determining the pressure of fuel in fuel reservoir 32 of injection system 28, it is sufficient to compare, during idling of internal combustion engine 36, desired quantities of fuel demanded by idle-speed controller 26 at at least two different values of the pressure, and at a constant idling speed. In this context, at least two values for the pressure of the fuel are set one after the other on the basis of values for the pressure, which are ascertained by rail pressure sensor 44. Furthermore, a desired quantity of fuel to be injected that is demanded by an idle-speed controller 26 is ascertained for each set value of the pressure as an internal controller variable of idle-speed controller 26. The desired quantities ascertained are compared to one another to check for the presence of a difference.

In this connection, in one embodiment, a first pressure of the fuel is set and a first desired quantity demanded is ascertained at the predetermined idling speed. In addition, a second pressure of the fuel is set and a second desired quantity demanded is ascertained for the predetermined idling speed. It is provided that the idling speed be kept constant by idle-speed controller 26. In this context, it is checked if these two demanded, desired quantities deviate from one another.

In a further embodiment, it may be checked if the desired quantities demanded differ from one another by a difference; at least one measure being taken when the difference deviates from a tolerance value.

In addition, a control-duration characteristics map 48 is used, which represents curves of quantities of fuel to be injected at different values of the pressure. In view of this control-duration characteristics map 48, it is also possible to select at least two values for the pressure of the fuel; in this case, these at least two values for the pressure also being set on the basis of a value for the pressure that is ascertained by rail pressure sensor 44. In addition, for each selected value of the pressure, a value for an actual control duration for providing the predetermined desired quantity of the fuel is set by an idle-speed controller 26 and compared to a value for a setpoint control duration, which is theoretically provided according to control-duration characteristics map 48. Furthermore, a difference between the value of the actual control duration and the theoretically provided value of the setpoint control duration is ascertained for each set value of the pressure. The differences between the actual and the setpoint control duration that are ascertained for the different values of the pressure, and therefore, the differences of the actual and the expected control duration, are compared to one another, as well.

Alternatively, or in addition, it is also possible to compare a difference of the expected values for the setpoint control duration, which should be produced during the performed checks at the selected values of the pressure indicated by the rail pressure sensor, to a difference of the values of the actual control duration actually measured, which are actually produced at the selected values of the pressure. If the difference of the expected, pressure-dependent values of the setpoint control duration deviates from the difference of the set, pressure-dependent values of the actual control deviation, this is an indication that the rail pressure sensor is reading incorrect values for the pressure of the fuel.

The desired quantity is normally demanded by idle-speed controller 26 as a function of a physically required quantity of fuel to be injected. The desired quantity demanded results automatically when the predetermined idling speed is adjusted by idle-speed controller 26. A value, which is provided by an output of idle-speed controller 26 as an internal controller variable of idle-speed controller 26, may be used as a measured variable for the desired quantities.

The present invention may be used for plausibility-checking rail pressure sensors 44 in all injection systems 28 that are configured as common rail systems.

It is possible to correct values, which are provided by rail pressure sensor 44, on the basis of a value of at least one deviation of an actual control duration from a setpoint control duration, provided that it does not exceed a specific tolerance value. The more pressure-dependent deviations for this are known, the more accurately such a correction may be undertaken.

What is claimed is:

1. A method for checking a rail pressure sensor of an internal combustion engine, comprising:
    setting at least two values for pressure of fuel in a fuel reservoir of an injection system based on values for the pressure which are ascertained by the rail pressure sensor;
    ascertaining, for a predetermined idling speed of the internal combustion engine, a desired quantity of fuel to be injected that is demanded by an idle-speed controller for each of the set values of the pressure, wherein the idle-speed controller controls idling operation of the internal combustion engine by controlling fuel injection into the internal combustion engine; and
    comparing the desired quantities to one another.

2. The method as recited in claim 1, further comprising:
    checking if the desired quantities demanded differ from one another.

3. The method as recited in claim 1, wherein the desired quantities demanded are internal controller variables of the idle-speed controller.

4. The method as recited in claim 1, wherein a control-duration characteristics map is used to ascertain the desired quantities of fuel, the control-duration characteristics map representing curves of quantities of fuel to be injected at different values of the pressure.

5. The method as recited in claim 1, wherein the desired quantity is demanded by the idle-speed controller as a function of a physically required quantity of fuel to be injected.

6. The method as recited in claim 1, wherein the desired quantity is automatically produced when a predetermined idling speed is adjusted by the idle-speed controller.

7. A method for checking a rail pressure sensor, comprising:
    setting at least two values for pressure of fuel in a fuel reservoir of an injection system based on values for the pressure which are ascertained by the rail pressure sensor;
    ascertaining a desired quantity of fuel to be injected that is demanded by an idle-speed controller for each of the set values of the pressure; and
    comparing the desired quantities to one another;
    wherein for each of the set values of the pressure, an actual control duration for providing the desired quantity of the fuel demanded is set and a setpoint control duration to be expected is ascertained by the idle-speed controller; and a difference between a value for the actual control duration and a value for the setpoint control duration is ascertained for each set value of the pressure, the ascertained differences between the values of the actual control duration and the values of the setpoint control duration being compared to one another for the different values of the pressure.

8. A method for checking a rail pressure sensor, comprising:
    setting at least two values for pressure of fuel in a fuel reservoir of an injection system based on values for the pressure which are ascertained by the rail pressure sensor;
    ascertaining a desired quantity of fuel to be injected that is demanded by an idle-speed controller for each of the set values of the pressure; and
    comparing the desired quantities to one another;
    wherein an actual control duration for providing the desired quantity of the fuel demanded is set and a setpoint control duration to be expected is ascertained by the idle-speed controller for each of the set values of the pressure; and a difference between the set actual control duration and a difference of the expected setpoint control duration are compared for at least two values of the set pressure.

9. The method as recited in claim 1, wherein a value, which is provided by an output of the idle-speed controller, is used as a measured variable for the desired quantities.

10. A system for checking a rail pressure sensor of an internal combustion engine, comprising:
    a control unit configured to set at least two values for pressure of fuel in a fuel reservoir of an injection system based on values for the pressure that the rail pressure sensor ascertains, the control unit being further configured to cause an idle-speed controller to ascertain, for each set value of the pressure, a desired quantity of fuel to be injected that is demanded by the idle-speed controller for a predetermined idling speed of the internal combustion engine, wherein the idle-speed controller controls idling operation of the internal combustion engine by controlling fuel injection into the internal combustion engine, and the control unit being further configured to compare the desired quantities to one another.

* * * * *